Patented Aug. 7, 1934

1,968,883

UNITED STATES PATENT OFFICE 1,968,883

RUBBER COMPOSITION

William C. Geer, New Rochelle, N. Y., assignor to The B. F. Goodrich Company, New York, N. Y., a corporation of New York No Drawing. Original application July 10, 1925, Serial No. 42,838. Renewed October 25, 1927. Divided and this application November 16, 1928, Serial No. 320,007

3 Claims. (Cl. 18—50)

This invention relates to compositions made from or containing rubber and its chief object is to provide rubber compositions having low moisture absorption, especially adapting them for marine cable or wire insulations, for example, where moisture absorption undesirably affects the electrical properties of the material.

In my copending application Serial No. 42,838, filed July 10, 1925, of which the present application is a division, I have described and claimed rubber compositions of the type hereinabove referred to which are composed at least in part of heat-plastic rubber derivatives, the latter being prepared from or comprising purified natural rubber.

The present invention is directed to the production of a purified crude rubber suitable for use in the heat-plastic compositions of the prior copending application hereinabove referred to, as well as for use by itself, or in other compositions, where low water absorption is a necessary or desirable property of a rubber product.

I have found that by removing substantially all of the water-absorbing impurities originally present in natural or crude rubber an improved product is obtained having a lower degree of moisture absorption, such product being better adapted for use in electrical insulation and the like than rubber compounds heretofore employed.

The removal of the water-absorbing ingredients from natural or crude rubber is preferably accomplished by milling or otherwise forming an emulsion of the rubber with a reagent capable of hydrolyzing and solubilizing the proteins and/or resins and other water-absorbing impurities, for example, such reagents as sodium carbonate, sodium hydroxide, sodium oleate or the like, and heating the rubber so treated in open steam or by boiling in water for from 10 to 36 hours. The modified proteins and resins, and the excess of reagent and other impurities, may then be removed by a thorough washing, as with clean hot water, after which the product is dried, preferably in a vacuum drier.

My invention may be variously modified as to procedure whereby the water-absorbing constituents of natural rubber are eliminated, and I do not wholly limit the claims hereto appended to the exact procedure described.

I claim:

1. The method of preparing an electrical insulation which comprises intimately admixing with natural rubber a strong alkali capable of hydrolyzing at least in part the water-absorbing constituents of natural rubber, boiling the rubber admixture in water, and thereafter washing the treated rubber to remove in substantial part the water-absorbing constituents and any excess alkali.

2. The method of preparing an electrical insulation which comprises intimately admixing with natural rubber an alkaline reagent selected from a class comprising sodium carbonate, sodium hydroxide, sodium oleate or the like, heating the rubber admixture in the presence of moisture to render effective the hydrolyzing action, and thereafter washing the treated rubber to remove in substantial part the water-absorbing constituents and any excess reagent.

3. The method of preparing an electrical insulation which comprises intimately admixing with natural rubber an alkaline reagent selected from a class comprising sodium carbonate, sodium hydroxide, sodium oleate or the like, boiling the rubber admixture in water, and thereafter washing the treated rubber to remove in substantial part the water-absorbing constituents and any excess reagent.

WILLIAM C. GEER.